(12) United States Patent
Chappell

(10) Patent No.: US 10,524,483 B2
(45) Date of Patent: Jan. 7, 2020

(54) SCRIBE SAW HEAD ASSEMBLY FOR CUTTING LOINS

(71) Applicant: Hall Fabrication, Inc., Las Vegas, NV (US)

(72) Inventor: Dave Chappell, Las Vegas, NV (US)

(73) Assignee: Hall Fabrication, Inc., Las Vegas, NV (US)

( * ) Notice: Subject to any disclaimer, the term of this patent is extended or adjusted under 35 U.S.C. 154(b) by 295 days.

(21) Appl. No.: 15/641,958

(22) Filed: Jul. 5, 2017

(65) Prior Publication Data

US 2019/0008171 A1    Jan. 10, 2019

(51) Int. Cl.
*A22C 17/00* (2006.01)
*A22C 17/02* (2006.01)
*F16H 1/14* (2006.01)
*F16C 19/44* (2006.01)
*F16C 19/54* (2006.01)

(52) U.S. Cl.
CPC .......... *A22C 17/0033* (2013.01); *A22C 17/02* (2013.01); *F16C 19/44* (2013.01); *F16C 19/541* (2013.01); *F16H 1/14* (2013.01); *F16C 2322/34* (2013.01)

(58) Field of Classification Search
CPC ... A22B 5/0041; A22B 5/0023; A22B 5/0029; A22B 5/0005; A22B 5/0035; A22B 5/007; A22B 5/0094; A22C 17/00
USPC ................. 452/148, 132, 133, 156
See application file for complete search history.

(56) References Cited

U.S. PATENT DOCUMENTS

| | | | | |
|---|---|---|---|---|
| 3,886,658 A * | 6/1975 | Wikoff | ................... | B23D 45/16 30/388 |
| 4,813,102 A * | 3/1989 | Ailey, Jr. | ............... | A22B 5/205 452/164 |
| 5,295,897 A * | 3/1994 | Kudo | ................... | A22C 25/163 30/101 |
| 5,407,384 A | 4/1995 | Boody et al. | | |
| 5,882,252 A | 3/1999 | Boody et al. | | |
| 7,207,114 B2 * | 4/2007 | Rosu | ..................... | B26B 25/002 30/276 |
| 8,448,340 B2 * | 5/2013 | Whited | ................. | B26B 25/002 30/276 |
| 8,893,391 B2 * | 11/2014 | Levsen | .................. | A22C 17/12 30/276 |
| 8,905,827 B1 * | 12/2014 | Ross | ..................... | A22B 5/163 452/133 |
| 8,986,081 B2 * | 3/2015 | Ueffing | ................ | A22B 5/0041 452/156 |

* cited by examiner

*Primary Examiner* — Richard T Price, Jr.
(74) *Attorney, Agent, or Firm* — McKee, Voorhees & Sease, PLC

(57) ABSTRACT

A scribe saw head assembly is provided for a loin puller and has substantially reduced wear and increased life of the assembly components. A pinion assembly includes a pinion shaft and a thrust bearing. The shaft has a flange to support the thrust bearing, which is retained by a pair of retainers. The flange and thrust bearing provides constant contact between the pinion shaft and the standard of the scribe saw assembly, prevents side to side movement of the pinion shaft, and prevents longitudinal floating of the pinion shaft.

11 Claims, 6 Drawing Sheets

SCRIBE SAW HEAD ASSEMBLY FOR CUTTING LOINS

FIELD OF THE INVENTION

This invention relates to the meat processing industry, and particularly to a scribe saw head assembly for cutting the loin from the carcass middle.

BACKGROUND OF THE INVENTION

Pork carcasses are typically cut into six initial portions, including the left and right front and hind quarters, and the left and right middles. The loin is part of the middle portion, adjacent the backbone in between the ribs and outer layer of back fat.

The conventional loin puller machine, which separates the loin from the carcass middle, has been substantially unchanged for approximately twenty years. One example of a prior art loin puller is from Acraloc, in Tennesee, as described in their U.S. Pat. No. 5,882,252.

The pork processing industry has had several long-standing problems with conventional loin pullers. In a conventional loin puller, a rotary scribe saw is provided to cut the meat. The scribe saw blade on a conventional loin puller is subject to wear and failure due to loads on the drive shaft. Since the blade operates at approximately 2,000 RPM, wear damage can occur quickly, leading to breakage of the blade. Such excessive wear can be the result of a side load on the drive gear shaft, which deflects the shaft and thereby deflects the blade, which then rubs on the standard. Breakage of the blade is a significant safety hazard.

A typical loin puller can process 1,300 pork middles per hour. Cutting accuracy is critical. For example, if the scribe saw cuts into the rib bone then the primary meat cutting blade cuts through the bone more than one-quarter inch into the belly underneath. That part or the belly, which later becomes bacon, then falls off causing yield loss. If the scribe saw cut is too shallow, when the meat cutting blade tries to pass through the scribe saw blade path, without the bone being cut all the way through. This partial bone cut results in major bone damage, with chips of broken bone distributed throughout the meat.

Another problem with the conventional loin puller is wear and damage to the various shafts. The pinion, which is mounted on the drive motor shaft, has a tendency to float along the shaft, thereby promoting uneven wear on the motor shaft and associated gears. Furthermore, the pinion shaft is typically connected to a motor drive shaft via a single keyway, which generates pressure on only one side of the motor shaft, which can lead to complete failure of the motor shaft. Also, because the ball bearing between the pinion shaft and motor shaft has very limited contact only at the point where the ball is touching the shafts, the longevity of the bearing, motor shaft, and pinion shaft is compromised. The single bearing use in a conventional loin puller also causes the ring or bevel gear and pinion gear to misalign due to flexing, thereby leading to excessive wear and breakage of the shafts and/or the scribe saw blade.

Therefore, a primary objective of the present invention is the provision of an improved scribe saw head assembly which overcomes the problems of the prior art.

A further objective of the present invention is the provision of a scribe saw head assembly for a loin puller having an improved pinion to minimize wear and damage.

Yet another objective of the present invention is the provision of a loin puller scribe saw assembly having a pinion with a radial flange to support a bearing.

A further objective of the present invention is the provision of a scribe saw head assembly for a loin puller which minimizes risk of shaft or blade damage.

Another objective of the present invention is the provision of a scribe saw head assembly for a loin puller which increases the life expectancy of the scribe saw blade and other components.

Another objective of the present invention is the provision of a scribe saw head assembly for a loin puller which is economical to manufacture, and simple, safe and durable in use.

These and other objectives become apparent from the following description of the invention.

SUMMARY OF THE INVENTION

The scribe saw head assembly includes a pinion assembly with a pinion shaft and a pinion gear mounted on the shaft. The shaft includes an outwardly extending radial flange with a bearing mounted on the shaft adjacent the flange. The flange positions the pinion shaft accurately and consistently on the motor output shaft, and supports the bearing to preclude side to side shifting of the pinion shaft. The flange also precludes longitudinal migration of the pinion shaft on the motor shaft, thus enhancing life of the pinion assembly, as well as the scribe assembly gears.

DETAILED DESCRIPTION OF THE INVENTION

Figure 1:
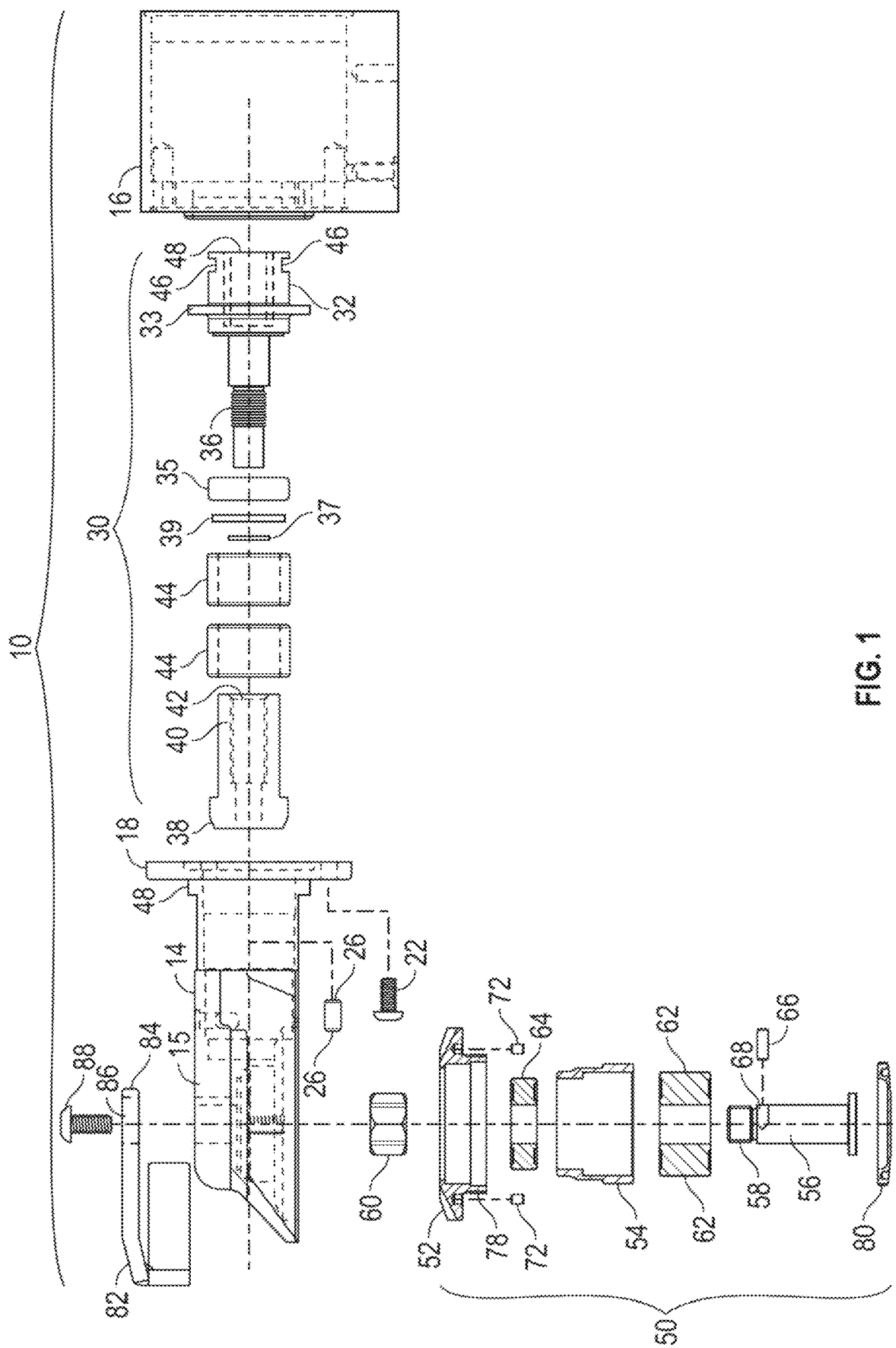
FIG. 1 is an exploded view of the scribe saw head assembly of the present invention.
Figure 2:
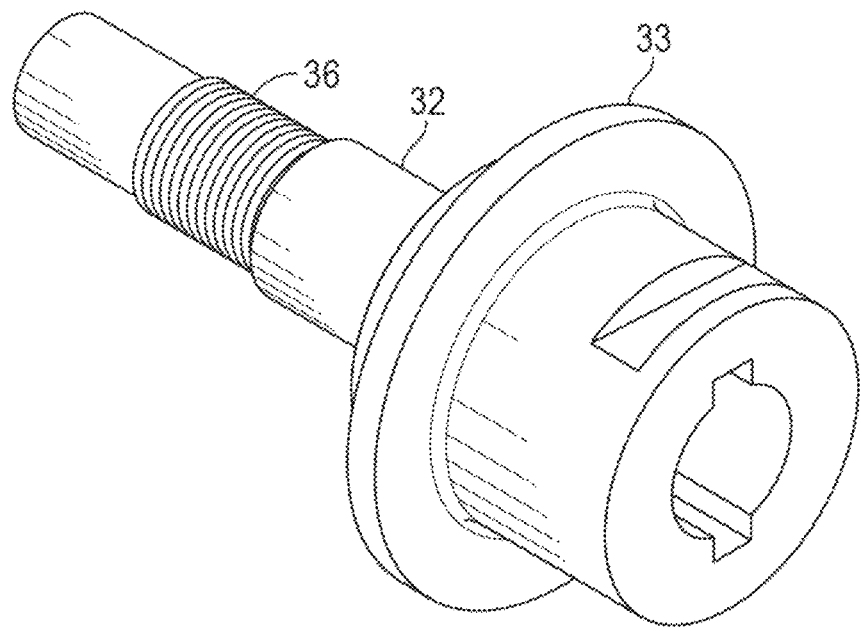
FIG. 2 is a perspective view of the pinion shaft of the scribe saw head assembly.
Figure 3:
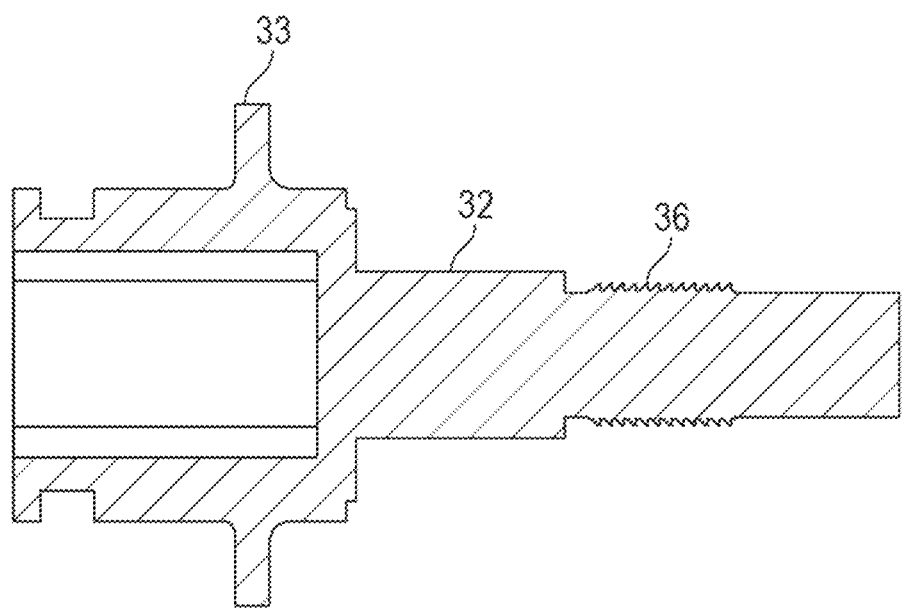
FIG. 3 is a sectional view of the pinion shaft.
Figure 4:
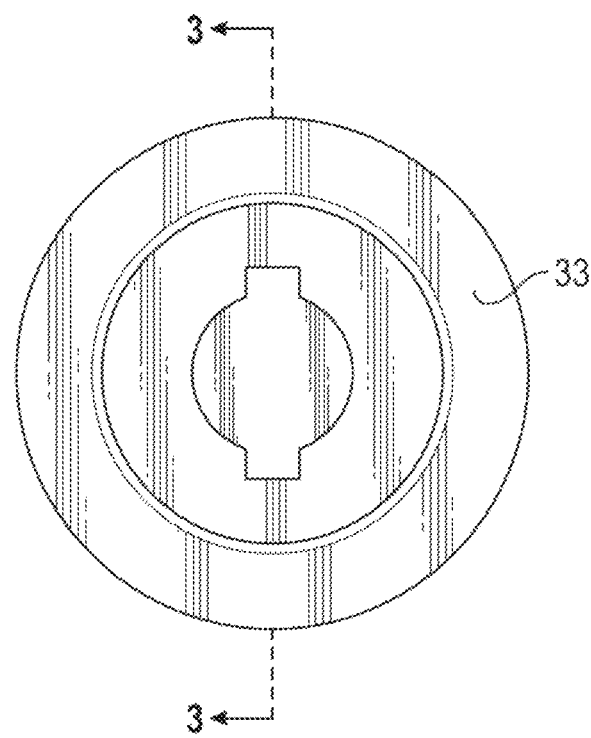
FIG. 4 is an end elevation view of the pinion shaft of the scribe saw head assembly.
Figure 5:
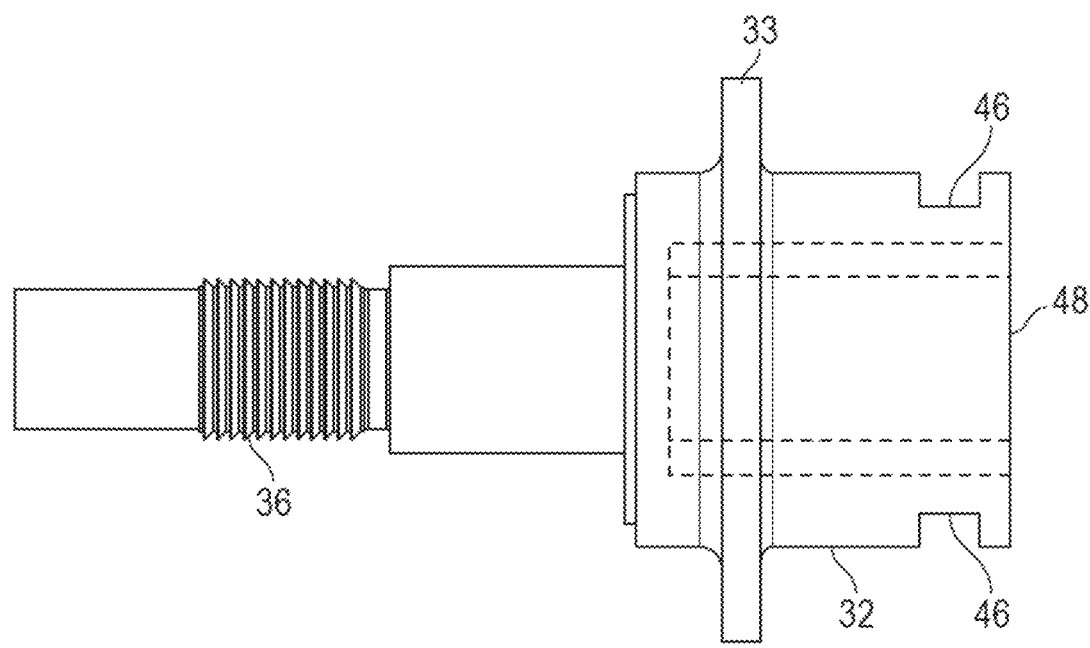
FIG. 5 is an enlarged side elevation view of the pinion shaft.
Figure 6:
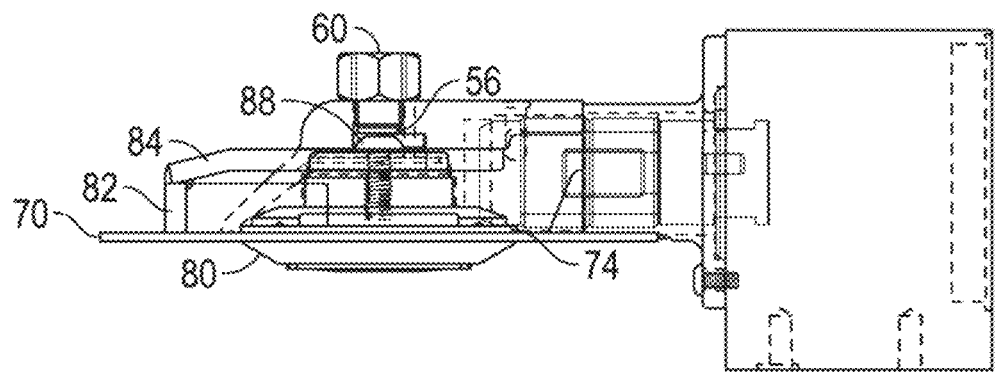
FIG. 6 is a side elevation view of the assembled components of the scribe saw assembly.
Figure 7:
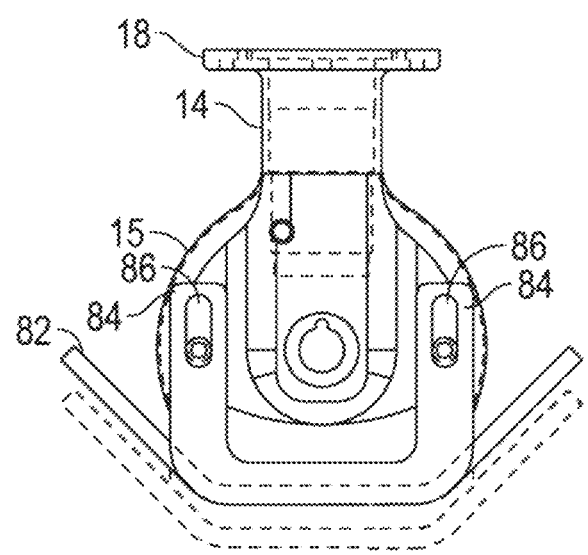
FIG. 7 is a front elevation view of the scribe saw standard with the adjustable ski in a retracted position.
Figure 8:
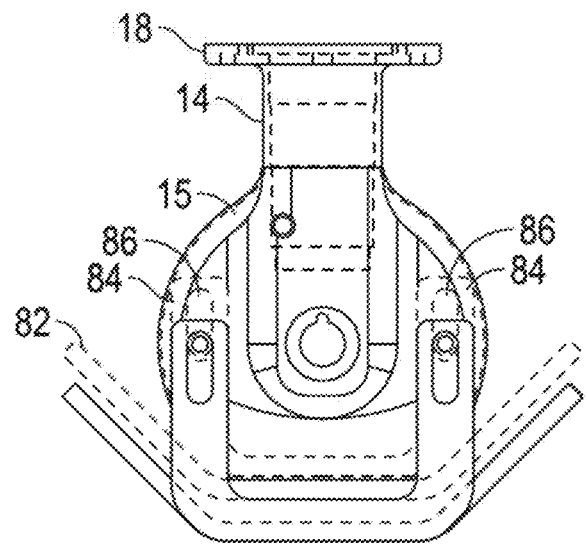
FIG. 8 is a view similar to FIG. 7 with the adjustable ski in an extended position.
Figure 9:
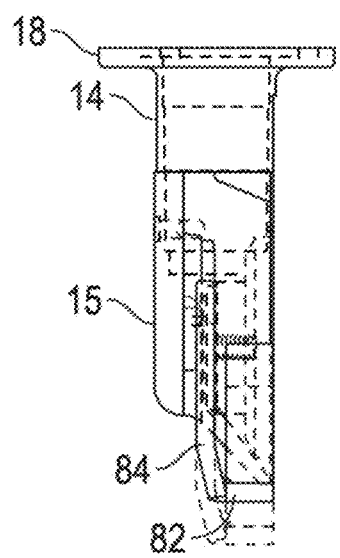
FIG. 9 is a side elevation view of the standard with the adjustable ski in a retracted position.
Figure 10:
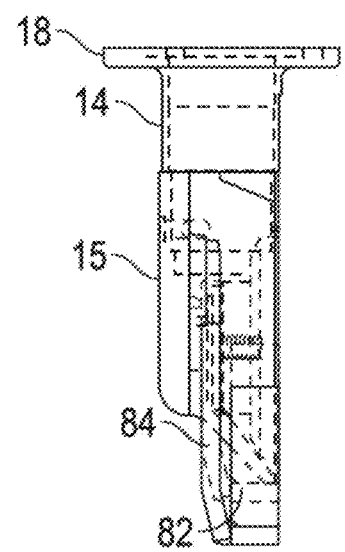
FIG. 10 is a view similar to FIG. 9 with the adjustable ski in an extended position.
Figure 11:
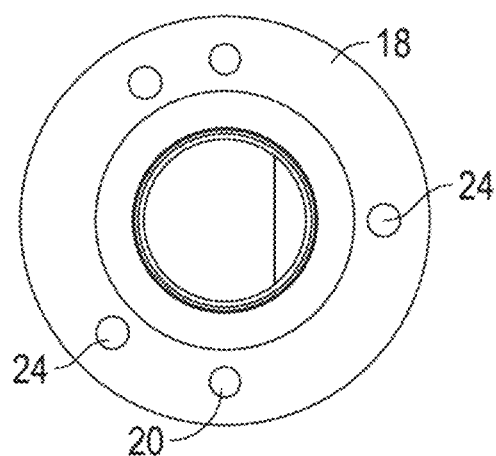
FIG. 11 is an elevation view of the mounting end of the standard of the scribe saw assembly.
Figure 12:
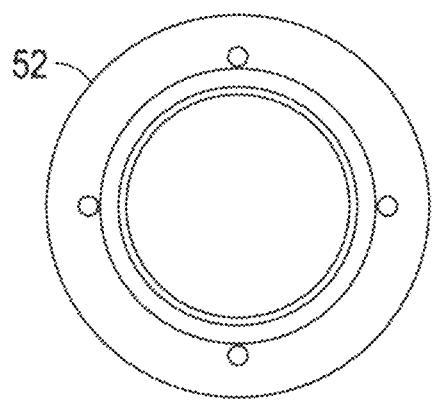
FIG. 12 is an elevation view of one side of the bevel gear of the scribe saw assembly.

The scribe saw assembly of the present invention is generally designated in the drawings by the reference numeral 10. The assembly 10 is part of a loin puller machine. The scribe saw head assembly 10 has a standard or head 14. The standard 14 is mounted to a motor housing 16 with a motor therein having an output or drive shaft. Preferably, the standard 14 is machined so as to produce a smooth finish, as compared to prior art cast standards. The smooth finish makes cleaning easier and minimizes bacteria traps. The back wall 15 of the standard 14 has been increased in thickness by approximately one-half inch, from 0.20" to 0.70". More particularly, the standard 14 has a circular flange 18 with a plurality of mounting holes 20 for receiving bolts 22 which extend through the flange 18 and into threaded holes in the motor housing 16. The flange 18 also includes a pair of holes 24 through which pins 26 extend into the motor housing 16. The pins 26 prevent operational side loads from transferring to the bolts 22, thereby preventing the bolts from loosening and becoming lost during operation of the loin puller.

A pinion assembly 30 and a bevel gear assembly 50 is disclosed in Applicant's co-pending application Ser. No. 14/950,142, filed Nov. 24, 2015, entitled Loin Puller Scribe Saw Assembly, and which is incorporated herein by reference.

The pinion assembly 30 is adapted to receive the motor drive shaft. The pinion shaft 32 also has a threaded output shaft 36 upon which a pinion gear 38 is mounted.

The body 40 of the pinion gear 38 has a threaded internal bore 42 to receive the output shaft 36. Bearings 44, such as needle bearings, are mounted on the pinion body 30. The use of the bearings 44 on the pinion shaft 32 provides contact substantially along the full length of the shaft, as opposed to a line contact provided by prior art roller bearings. Thus, the needle bearing provides approximately one hundred times more contact for better control of the pinion assembly 30, increasing the longevity of the motor shaft, pinion shaft 32, and bearing 44.

Pinion assembly 30 extends substantially into the hollow body 48 of the standard 14. The pinion shaft 32 also includes a pair of external cutouts 46, each of which receive a key for providing a tight fit of the pinion to the pinion shaft 32. In other words, the external cutouts 46 form a double key slot. This double cutout and key construction allows for the receipt of multiple lock keys to substantially equal pressure on both sides of the motor shaft, thereby precluding uneven forces on the motor shaft and extending the life of the motor shaft.

A bevel gear assembly 50 is mounted in the standard 14 and generally extends perpendicular to the pinion assembly 30. The bevel gear assembly 50 includes a bevel gear 52 mounted on a bushing 54, and a shaft 56 extending through the gear 52, bushing 54, and the standard 14. The end 58 of the shaft 56 is threaded, and extends beyond the back wall of the standard 14 to receive a retaining nut 60. The shaft 56 extends to a first bearing 62 fit within the bushing 54, and a second bearing 64 fit within the standard 14. The shaft 56 is locked to the standard 14 by a pin 66 to prevent rotation of the shaft 56. The pin 66 extends into a transverse hole 68 in the shaft 56, with the outer end of the pin 66 being received in a slot or notch formed in the back wall of the standard 14.

The gears 62, 64, which reside within the bushing 54, provide substantial contact with the gear shaft 56, without the use of a conventional spacer. This construction minimizes or eliminates side loads on the gear shaft 56, and thereby prevents deflection of the shaft 56, which would otherwise be transferred to the scribe saw blade 70.

The scribe saw blade 70 is mounted to the bevel gear 52 via four pins 72 press fit into holes or sockets in the front face of the bevel gear 52. The pins 72 provide constant holding power for the blade 70. A grease shield 74 may reside between the blade 70 and the bevel gear 52 to seal the bevel assembly 50 against exterior contamination. A blade nut can be threadably mounted on the bevel gear ring 78 to retain the blade 70 on the bevel gear assembly 50. The ring 78 includes internal threads for threadable coupling of a bear lock nut 80.

The depth of cut of the blade 70 is controlled by an adjustable ski 82 mounted on the standard 14. In a preferred embodiment, the ski 82 has a mounting bracket comprised of a pair of arms 84 each having a slot 86 therein. A bolt 88 extends through each of the slots 86 and into the back of the standard 14. The vertical position of the ski 82 can be adjusted by loosening the bolts 88 and sliding the ski arms up or down via the slots 86 to a desired position. Then the bolts 88 are re-tightened to maintain the ski 82 in the selected position.

The present invention is directed toward improvements to the pinion assembly 30. In particular, the pinion shaft 32 includes a flange 33 extending radially outwardly. A bearing, such as a thrust bearing, is provided on the shaft 32 adjacent to the flange 33. A washer (preferably hardened) 37 and a retainer 39 also mount on the shaft 32 on the opposite side of bearing 35 of the flange 33 so as to capture the bearing 35 securely, but not so tightly as to block the bearing 35. The flange 33 also contacts an interior wall of the standard 14 to provide constant contact and preclude side-to-side movement of the pinion shaft 32 relative to the standard 14. The flange 33 also eliminates longitudinal float of the pinion shaft 32 along the motor shaft. Thus, the flange 33 and the bearing 35 extends the life of the head assembly 30 by eliminating uneven wear of the various components.

The invention has been shown and described above with the preferred embodiments, and it is understood that many modifications, substitutions, and additions may be made which are within the intended spirit and scope of the invention. From the foregoing, it can be seen that the present invention accomplishes as least all of its stated objectives.

What is claimed is:

1. A scribe saw assembly, comprising:
   a standard to drivingly support a scribe saw rotary blade;
   a rotary scribe saw blade mounted on the standard for cutting a carcass middle;
   a motor operatively connected to the blade for rotating the blade;
   a pinion gear and a bevel gear meshingly mounted in the standard, with the motor drivingly connected to the pinion gear and the blade drivingly connected to the bevel gear;
   a shaft interconnecting the pinion gear and the motor;
   a flange extending radially outward on the shaft.

2. The assembly of claim 1 further comprising a thrust bearing on the shaft adjacent the flange.

3. The assembly of claim 1 further comprising, a pair of needle bearings on the shaft to provide shaft contact along the length of the bearings.

4. The assembly of claim 1 further comprising a retainer on the shaft adjacent the thrust bearing and opposite the flange.

5. A scribe saw head assembly for a loin puller machine, comprising:
   a standard adapted to drivingly support a scribe saw rotary blade;
   a pinion assembly including a pinion shaft with a pinion gear mounted on the pinion shaft;
   a motor drivingly connected to the pinion assembly;
   the pinion shaft having an outwardly extending flange; and
   a thrust bearing on the pinion shaft adjacent the flange.

6. The assembly of claim 5 further comprising at least one needle bearing on the shaft adjacent the pinion gear.

7. The assembly of claim 5 further comprising a retainer on the shaft adjacent the thrust bearing and opposite the flange.

8. The assembly of claim 5 wherein the pinion shaft includes a double key slot to receive two keys to equalize pressure on the shaft.

9. A method of minimizing wear of a pinion assembly of a scribe saw, comprising:
   installing a bearing adjacent a radial flange on a shaft of the pinion assembly to substantially eliminate longitudinal float of the shaft.

10. The method of claim 9 further comprising installing a needle bearing on the shaft spaced from the thrust bearing to substantially eliminate side to side movement of the shaft.

11. The method of claim 9 further comprising utilizing multiple lock keys to substantially equalize pressure on the shaft.

\* \* \* \* \*